Patented Aug. 7, 1951

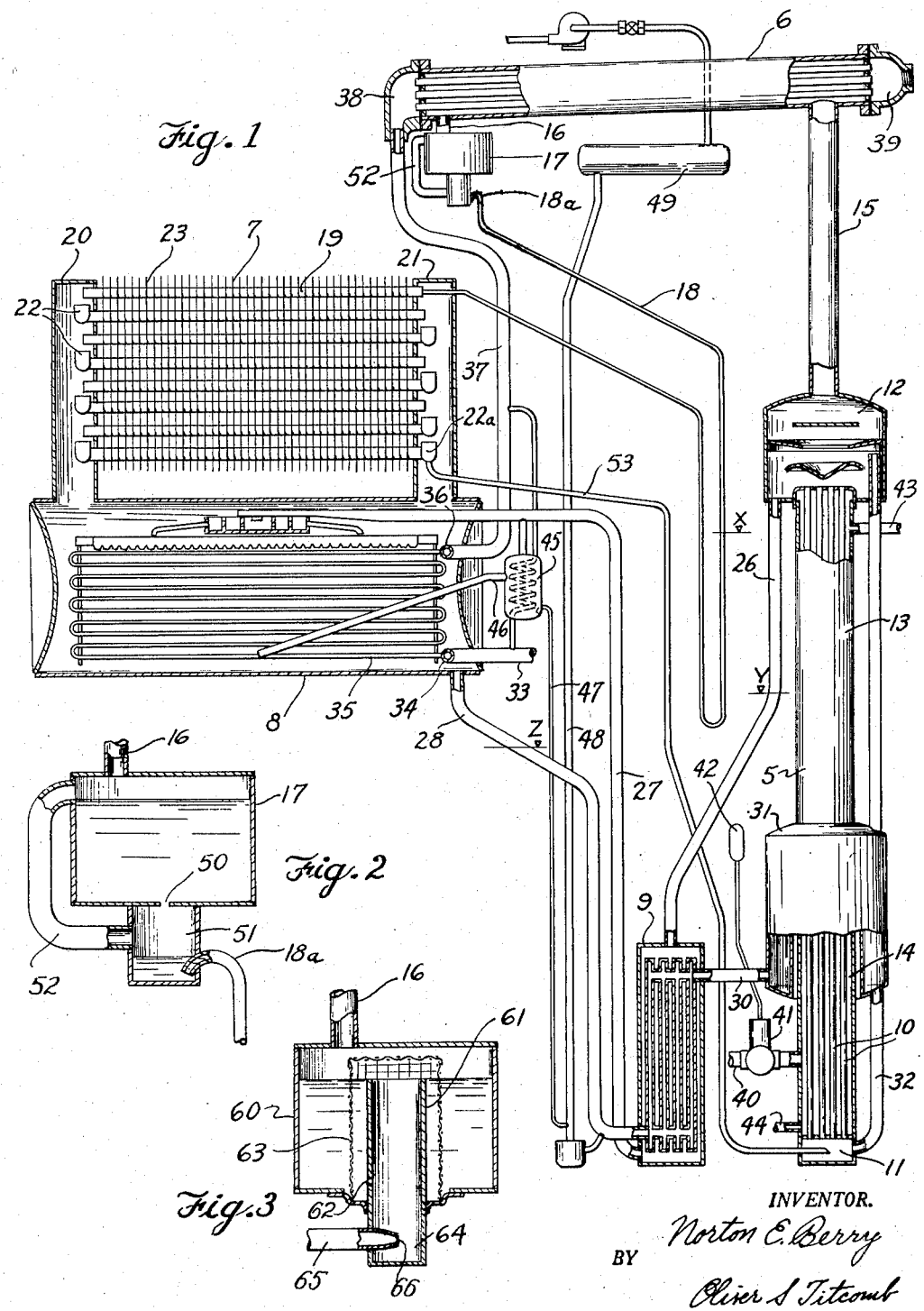

2,563,574

UNITED STATES PATENT OFFICE 2,563,574

ABSORPTION REFRIGERATION

Norton E. Berry, Newburgh, Ind., assignor to Servel, Inc., New York, N. Y., a corporation of Delaware Application January 28, 1947, Serial No. 724,821

9 Claims. (Cl. 62—119)

The present invention relates to absorption refrigeration and more particularly to promoting the boiling of solution in the generator.

The present invention is particularly adapted for use with an absorption refrigeration system of the type illustrated and described in United States Letters Patent to Albert R. Thomas et al., No. 2,301,232, issued November 10, 1942, entitled Refrigeration. Such a system operates in a partial vacuum and utilizes water as a refrigerant and a hygroscopic salt as an absorbent. Preferably the absorption solution is heated by a heating medium at a constant predetermined temperature, such as steam at atmospheric pressure, to control the concentration of the solution and thereby prevent the crystallization of salt out of solution which may plug or partially obstruct the conduits and cause improper circulation of the solution. It has been found in such systems that even when the temperature of the heating medium is well above the boiling point of the solution in the generator the solution will not always boil. This phenomenon is known as "superheating" and usually occurs at the beginning of a period of operation of the system.

One of the objects of the present invention is to provide a method of and apparatus for countering the effect of superheating by supplying liquid refrigerant to the solution in the generator to lower its boiling point at the beginning of a period of operation.

Another object of the invention is to accumulate a predetermined amount of liquid refrigerant in its path of flow during operation of the system and deliver the accumulated liquid refrigerant to the generator after the completion of a period of operation of the system.

Another object is to provide a storage vessel in the system for receiving liquid refrigerant at a predetermined rate and delivering the refrigerant at a slower rate until a predetermined amount has been accumulated and continuing to deliver the accumulated refrigerant after the completion of a period of operation to dilute the solution in the generator.

Still another object is to limit the loss of useful refrigerant to the predetermined amount supplied to the generator at the completion of a period of operation.

These and other objects will become more apparent from the following description and drawings in which like reference characters denote like parts throughout the several views. It is to be expressly understood, however, that the drawings are for the purpose of illustration only and not a definition of the limits of the invention, reference being had for this purpose to the appended claims. In the drawings:

Fig. 1 is a diagrammatic view of an absorption refrigeration system for carrying out the method of the present invention and showing the storage vessel and conduit for accumulating a supply of liquid refrigerant and delivering the accumulated refrigerant to the generator.

Fig. 2 is a transverse sectional view through the storage vessel illustrated in Fig. 1 and showing the metering orifice for retarding the flow to accumulate liquid refrigerant in the vessel and the overflow conduit for delivering refrigerant after the storage vessel is filled, and Fig. 3 is a transverse sectional view of a storage vessel of modified construction.

The method of the present invention comprises the steps of retarding the flow of liquid refrigerant during operation of the system until a predetermined amount of refrigerant is accumulated and then continuing the flow of the accumulated liquid refrigerant to the generator after completion of a period of operation. The accumulated refrigerant supplied to the generator dilutes the absorption solution and lowers the boiling point of the solution. Thus, boiling of solution in the generator is promoted at the beginning of the next period of operation due to the greater temperature difference between the heating medium and the temperature of boiling. By accumulating the proper amount of liquid refrigerant for the operating conditions of the particular unit, such as the normal concentration and amount of solution in the generator and the temperature of the heating medium, boiling will be assured even when superheating occurs.

Referring to the drawings, the present invention is shown applied to an absorption refrigeration system for conditioning air of the type illustrated and described in the Thomas et al. patent referred to above. Suffice it to state herein that the refrigeration system comprises generator 5, condenser 6, evaporator 7, absorber 8, and heat exchanger 9, interconnected to provide paths of flow for the circulation of refrigerant and absorbent through the system in closed circuits. Generator 5 has a series of upright tubes 10 connected at their lower ends to an inlet chamber 11 for absorption solution and connected at their upper ends to a separating chamber 12. Surrounding the tubes 10 is a shell 13 providing a heating chamber 14 therebetween. The separating chamber 12 is connected to the condenser 6 by a conduit 15 and the condenser, in turn, is connected by a conduit 16 to a storage vessel 17, later to be described in detail. A depending U-shaped conduit 18 connects the storage vessel 17 to the evaporator 7 and has a curved upper end 18a connected to a sump at the bottom of the vessel.

The evaporator 7 is generally similar to that illustrated and described in the Thomas et al. patent, referred to above, and comprises a series of substantially horizontal tubes 19 extending between headers 20 and 21. Refrigerant supplied to one end of the uppermost tube 19 in the header 21 flows therethrough and is collected in a trough 22 in the header 20 for directing it into the end of the next lowermost tube. Each tube has a trough for collecting refrigerant from the next adjacent upper tube and delivering it for flow therethrough by gravity so that the refrigerant flows through each tube successively from the top to the bottom of the evaporator. Evaporator 7 communicates with the absorber 8 through the passages or headers 20 or 21 which open directly into the top of the absorber. The headers 20 and 21 together with the top of the absorber 8 constitute a passageway for directing a stream of air to be conditioned over the tubes 19 and between a series of vertical fins 23 in thermal contact with the tubes to transfer heat from the air to the refrigerant in the tubes.

Absorption solution weak in refrigerant or, in other words, a concentrated salt solution flows from the separating chamber 12 to the top of the absorber 8 in a path of flow including the conduit 26, heat exchanger 9, and conduit 27. Absorption solution strong in refrigerant or, in other words, dilute solution flows from the bottom of the absorber 8 to the inlet chamber 11 of the generator 5 in a path of flow including the conduit 28, heat exchanger 9, conduit 30, leveling vessel 31 and conduit 32. The generator 5 and condenser 6 are maintained at a higher pressure than the evaporator 7 and absorber 8 by liquid columns in the conduits 18, 27 and 28. In Fig. 1 the liquid level in the conduit 18 is indicated by the reference character x, the liquid level in conduit 26 connected to the conduit 27, through the heat exchanger 9, is indicated by the reference character y, and the liquid level in the conduit 28 is indicated by the reference character z.

The absorber 8 and condenser 6 are cooled by cooling water from any suitable source, such as a city main, cooling tower, or the like. The cooling water is supplied through a conduit 33 to a header 34 which supplies the cooling water to a bank of pipe coils 35 in the absorber 8. Cooling water from the coils 35 is delivered to a header 36 and from the header it flows through a conduit 37 to the inlet chamber 38 of the condenser 6. Cooling water from the condenser is discharged from the chamber 39 to a waste pipe, not shown.

The generator 5 is heated by steam supplied through a conduit 40 from any suitable source such as a boiler, not shown. For purposes of illustration, the means for controlling the supply of steam to the heating chamber 14 is shown as a valve 41 operated by a suitable thermostat having a bulb 42 subjected to the ambient to be conditioned. The arrangement is preferably such that when the temperature of the ambient air rises above a predetermined point the valve 41 will open to supply steam to the heating chamber 14 of the generator 5 and when the temperature falls below the predetermined point the valve closes to shut off the supply of steam. Although the valve 41 is shown merely for the purpose of simplicity of illustration, it is to be understood that a boiler controlled heating system such as illustrated in the Thomas et al. Patent No. 2,282,504 issued May 12, 1942, entitled Refrigeration, is preferably used for supplying steam to the generator. The upper end of the heating chamber 14 of the generator 5 is vented to the atmosphere by a vent pipe 43 and condensate drains from the lower end of the heating chamber through a drain pipe 44. Thus, the steam supplied to the heating chamber 14 of the generator 5 is maintained at a predetermined constant pressure and temperature and its heat is transferred through the tubes 10 to heat the absorption solution therein and expel refrigerant therefrom. The rate at which refrigerant is expelled from the absorption solution in the generator 5 is dependent upon the amount of steam supplied to the heating chamber 14.

With this type of system a purging device is preferably provided for constantly withdrawing non-condensable gases from the absorber 8. As illustrated in Fig. 1 of the drawings the purging device comprises an auxiliary absorber 45 having a suction tube 46 extending into the absorber 8. A siphon pump tube 47 is connected between the auxiliary absorber 45 and a riser tube 48 connected to the conduit 28 at its lower end and to a storage vessel 49 at its upper end. The auxiliary absorber 45 draws refrigerant vapor and non-condensable gases from the main absorber 8 and the refrigerant vapor is absorbed in solution flowing through the auxiliary absorber. The siphon pump tube 47 exhausts the solution and non-condensable gases in alternate slugs and the solution flows into the conduit 28 while the gases rise through the riser tube 48 and are collected and stored in the storage vessel 49.

In accordance with the present invention the storage vessel 17 in the connection between the condenser 6 and evaporator 7 retards the flow of liquid refrigerant during operation of the system until a predetermined amount of refrigerant is accumulated and delivers the accumulated refrigerant to the generator after a period of operation has been completed. As illustrated in Fig. 2 the storage vessel receives all of the liquid refrigerant delivered from the condenser 6 and has a metering orifice 50 in the bottom thereof for delivering refrigerant at a predetermined slow rate to a collecting vessel or sump 51 below the orifice. The measuring orifice 50 is so dimensioned as to deliver liquid refrigerant at a much slower rate than it is received from the condenser so that the liquid accumulates therein. An overflow or by-pass conduit 52 has one end connected to the side of the storage vessel adjacent the top thereof and its other end connected to the sump 51. When the liquid refrigerant rises in the storage vessel 17 to the level of the conduit 52 it overflows into the sump 51. The upper end of the U-shaped conduit 18 is connected to the sump 51 and, as illustrated in Fig. 2, the end 18a is curved, as previously explained, to provide a siphon pump for delivering the refrigerant in intermittent slugs and trapping any non-condensable gases between adjacent slugs.

Also in accordance with the present invention the trough 22a at the end of the lowermost tube 19 of the evaporator 7 is connected by a relatively small conduit 53 to the inlet chamber 11 at the bottom of the generator 5. One form of the invention having now been described in detail the mode of operation is as next explained.

For purposes of description let it be assumed that the refrigeration system is in operation and the steam valve 41 is open to supply steam to the heating chamber 14. The steam condenses in the chamber 14 and transfers its heat to the solution in the tubes 10 to vaporize the refrigerant at the low pressure therein, the expelled vapor lifting the absorption solution in the tubes to the separating chamber 12 by vapor lift action. The vaporized refrigerant flows through the conduit 15 to the condenser 6 where it is condensed and the absorption solution weak in refrigerant flows to the top of the absorber 8 in the path of flow including the conduit 26, heat exchanger 9, and conduit 27.

The liquefied refrigerant flows from condenser 6 through the conduit 16 into the storage vessel 17 and flows from the vessel through the metering orifice 50 at a slow rate. As the orifice 50 is designed to deliver liquid refrigerant at a slower rate than it is supplied from the condenser 6, it retards the flow and causes refrigerant to accumulate in the storage vessel 17. The liquid refrigerant will continue to accumulate until the liquid rises to a level causing it to overflow through the conduit 52. The refrigerant is then delivered simultaneously through the metering orifice 50 and conduit 52 to the sump 51 and a predetermined amount of accumulated refrigerant is retained in the storage vessel 17.

When the liquid level in the sump 51 rises above the top of the curved end portion 18a of the U-shaped tube 18, it acts as a siphon pump for delivering refrigerant into the tube until the level in the sump falls below the end of the tube. Any non-condensable gases in the sump 51 then enter the end of the tube and are trapped therein as the liquid level again rises. Thus, the U-shaped conduit 18 operates to deliver slugs of liquid intermittently and to trap inert gas between successive slugs.

The liquid refrigerant flows through the U-shaped tube 18 into the uppermost tube 19 of the evaporator 7 and flows through successive tubes of the evaporator in series. The air to be conditioned flowing between the fins 23 and tubes 19 of the evaporator 7 transfers heat to vaporize the refrigerant in the tubes. Due to the construction of the evaporator 7 all of the refrigerant is evaporated therein during its flow therethrough when the system is in operation and the refrigerant vapor flowing through the tubes 19 and headers 20 and 21 is absorbed in the absorption solution in the absorber 8. The absorption solution strong in refrigerant then flows back to the generator 5 through the path of flow including the conduit 28, heat exchanger 9, conduit 30, leveling vessel 31, and conduit 32 to the inlet chamber 11.

When the air to be conditioned has been sufficiently cooled the thermostat comprising the bulb 42 subjected to the ambient temperature operates to close the steam valve 41. Upon closing of the valve 41 insufficient heat is available to cause pumping of solution in the tubes 10 of the generator 5 but a limited vaporization of refrigerant will continue until the temperature in the chamber 14 falls below the boiling temperature of the solution. When the flow of absorption solution to the absorber 8 stops, the rate of absorption of refrigerant vapor decreases which causes a rise in the pressure and temperature in the evaporator so that the refrigerant is no longer evaporated therein. In other words, a period of operation of the system has been completed. However, the refrigerant accumulated in the storage vessel 17 continues to flow through the measuring orifice 50 into the sump 51 and to flow through the U-shaped tube 18 into the evaporator 7. The liquid refrigerant then flows through the tubes 19 of the evaporator successively without evaporation due to the increased pressure and temperature therein. The refrigerant entering the trough 22a at the end of the lowermost tube 19 of the evaporator will increase the height of the hydrostatic head in the conduit 53 and cause a flow through the conduit directly to the inlet chamber 11 of the generator 5. After all of the solution in the tube 53 has been displaced, liquid refrigerant enters the chamber 11 and being lighter than the solution will rise into the tubes 10. The liquid refrigerant entering the tubes 10 mixes with the absorption solution therein and dilutes the absorption solution which lowers its boiling point. While an amount of solution equal to the weight of the added refrigerant will be displaced from the chamber 11, the solution displaced will contain very little, if any, of the refrigerant delivered through the conduit 53 due to the tendency of the lighter refrigerant to rise through the solution and into the tubes 10. Upon actuation of the valve 41 to initiate the next period of operation of the system the dilute solution in the generator will promote boiling. By properly designing the storage vessel 17 to accumulate the proper amount of refrigerant, boiling of the solution will be assured even though superheating occurs.

In Fig. 3 a storage vessel 60 of modified construction is illustrative having a central tube or standpipe 61 which extends upwardly through the bottom and terminates adjacent the top thereof. The standpipe 61 has a metering orifice 62 in its side for delivering refrigerant at a predetermined slower rate than it is supplied to the storage chamber 60 through the conduit 16. Preferably, a screen 63 surrounds the standpipe 61 to filter out scale or other foreign matter in the refrigerant flowing to the standpipe. The tube or standpipe 61 extends below the storage vessel and has a closed bottom to provide a sump 64. As the liquid refrigerant is delivered through the measuring orifice 62 at a slower rate than it is supplied to the storage vessel, the liquid will rise in the vessel until it overflows the top of the standpipe 61 and enters the sump 64. In the modified construction the U-shaped tube 18 for producing a liquid column to maintain the difference in pressures is replaced by a conduit 65 having an orifice 66 of the type claimed in my copending application filed concurrently herewith. The conduit 65 extends horizontally into the sump 64 and has a reduced end to provide the orifice 66. The orifice 66 is so dimensioned as to permit the unrestricted flow of liquid refrigerant and a limited flow of uncondensed refrigerant. With such an arrangement any uncondensable gases will flow out of the condenser 6 with refrigerant vapor.

The storage vessel 60 operates in substantially the same way as the storage vessel 17 previously described. Liquid refrigerant flows from the condenser 6 through the conduit 16 into the vessel 60 and is delivered at a predetermined slow rate through the measuring orifice 62. Thus, at the beginning of a cycle of operation a supply of liquid refrigerant accumulates in the vessel 60 until it overflows the top of the standpipe 61. After a cycle of operation has been completed the accumulated refrigerant continues to flow through the metering orifice 62 and through the delivery conduit 65, tubes 19 of the evaporator 7, trough 22a, and conduit 53 to the inlet chamber 11 of the generator 5.

It will now be observed that the present invention provides a novel method and apparatus for promoting the boiling of solution in the generator of an absorption refrigeration system. It will also be observed that the present invention provides for retarding the flow of refrigerant at the beginning of a period of operation to accumulate a supply of refrigerant and after the completion of a period of operation continues to deliver refrigerant to the generator to dilute the solution therein. It will still further be observed that the present invention provides a simple and compact arrangement of elements for delivering a predetermined amount of refrigerant to the generator after a period of operation without any additional loss of refrigerant during operation of the system.

While two embodiments of the invention are herein illustrated and described, it will be understood that further modifications may be made in the construction and arrangement of the elements without departing from the spirit or scope of the invention. Therefore, without limiting myself in this respect, reference is to be had to the appended claims for a definition of the limits of the invention.

What is claimed is:

1. In an absorption refrigeration system of the type which operates in a partial vacuum and utilizes water as a refrigerant and a salt solution as an absorbent, a plurality of elements including a generator interconnected to provide paths of flow for the circulation of a refrigerant and absorbent, means for heating the generator, a thermostat for controlling the heating means to operate the system, means including a restrictor in the path for refrigerant for retarding the flow of liquid refrigerant during operation of the system until a predetermined amount is accumulated in the path of flow, said accumulated refrigerant continuing to flow after the completion of a period of operation, and a conduit for delivering the accumulated refrigerant to the generator.

2. In an absorption refrigeration system adapted to operate periodically, a generator, a condenser, an evaporator, an absorber, means connecting the elements to provide paths of flow for the circulation of a refrigerant and absorbent, a storage vessel in the connection between the condenser and evaporator having a metering orifice and an overflow conduit above the orifice, said metering orifice retarding the flow of liquid refrigerant to accumulate liquid refrigerant in the storage vessel during operation of the system and continuing the flow of refrigerant after a period of operation of the system is completed, and conduit means for delivering the accumulated liquid refrigerant to the generator to dilute the absorption solution therein.

3. In an absorption refrigeration system adapted to operate periodically, a generator, a condenser, an absorber, means connecting the elements to provide paths of flow for the circulation of a refrigerant and absorbent, said evaporator having a plurality of tubes through which liquid refrigerant flows by gravity, a trough at the end of the lowermost tube for receiving any refrigerant overflowing from the evaporator, a conduit connecting the overflow trough in the evaporator directly to the generator, a storage vessel in the connection between the condenser and evaporator, said storage vessel having flow control means for retarding the flow of liquid refrigerant therefrom until a predetermined amount has accumulated therein and delivering refrigerant after a period of operation of the system is completed whereby the accumulated refrigerant is delivered to the generator between periods of operation.

4. In an absorption refrigeration system, a generator, a condenser, an evaporator, an absorber, means connecting the elements to provide paths of flow for the circulation of a refrigerant and absorbent, heating means for heating the generator at a predetermined constant temperature, a thermostat for controlling the heating means to cause operation of the system periodically, said evaporator having a plurality of tubes through which the refrigerant flows by gravity, a trough for receiving liquid refrigerant overflowing from the lowermost tube of the evaporator, a conduit connecting the overflow trough in the evaporator to the generator, and a storage vessel in the connection between the condenser and the evaporator, said storage vessel having flow control means including a restricting orifice and an unrestricted overflow conduit for accumulating liquid refrigerant during operation of the system and delivering refrigerant after a period of operation of the system is completed whereby the accumulated refrigerant flows through the evaporator and conduit to the generator to lower the boiling point of the solution in the generator.

5. In an absorption refrigeration system adapted to operate periodically, a generator, a condenser, an evaporator, an absorber, means interconnecting the elements to provide paths of flow for the circulation of a refrigerant and absorbent, means in the connection between the condenser and evaporator for retarding the flow of liquid refrigerant therethrough comprising a storage vessel having a metering orifice in the bottom thereof, a chamber below the orifice, a by-pass conduit connecting the side of the storage vessel and chamber, and a siphon tube connecting the chamber to the evaporator, said metering orifice limiting the flow of liquid refrigerant from the storage vessel to cause an accumulation of refrigerant therein and said siphon tube delivering alternate slugs of liquid refrigerant and gas to purge non-condensable gases from the condenser, said metering orifice continuing to deliver liquid refrigerant after the completion of a period of operation of the system, and conduit means for delivering the accumulated liquid refrigerant to the generator.

6. In an absorption refrigeration system adapted to operate periodically, a generator, a condenser, an evaporator, an absorber, means interconnecting the elements to provide paths of flow for the circulation of a refrigerant and absorbent, means in the connection between the condenser and evaporator for retarding the flow of liquid refrigerant therethrough comprising a storage vessel having a standpipe therein, a metering orifice in the standpipe adjacent the bottom of the storage vessel for delivering liquid refrigerant at a predetermined slow rate into the standpipe to cause an accumulation of refrigerant in the storage vessel, said refrigerant overflowing the top of the standpipe to limit the amount of refrigerant accumulated in the storage vessel, a tube connected to the interior of the standpipe for delivering liquid refrigerant and non-condensable gases from the standpipe to the evaporator, said metering orifice adjacent the bottom of the standpipe continuing to supply liquid refrigerant after a period of operation of the system is completed, and conduit means for delivering the accumulated liquid refrigerant to the generator between periods of operation.

7. In a method of refrigeration with the aid of an absorption refrigeration system comprising initiating a period of operation by the application of heat at a place of expulsion to expel refrigerant vapor from absorption solution, liquefying the refrigerant vapor, and subjecting the liquefied refrigerant to the action of absorbent to cause it to evaporate at a low temperature at a place of evaporation, that improvement which comprises flowing liquid refrigerant in a path of flow at a slow rate to cause a predetermined amount to accumulate in the path of flow, flowing refrigerant through another path of flow after a predetermined amount has been accumulated, delivering refrigerant from both paths of flow to the place of evaporation, discontinuing the application of heat to terminate the period of operation, and continuing the flow of accumulated liquid refrigerant from the first path to the place of expulsion after a period of operation has been terminated to promote boiling at the beginning of the next period of operation.

8. In an absorption refrigeration system having a generator, a liquefier, an evaporator, an absorber, and conduit means interconnecting the elements to provide paths of flow for refrigerant and absorbent, means for controlling the supply of heat to the generator to initiate and stop a period of operation of the system, said conduit means between the liquefier and evaporator comprising a path through which refrigerant flows at a slow rate to cause a predetermined amount of liquid refrigerant to accumulate therein and a second path through which refrigerant flows from the liquefier to the evaporator after a predetermined amount has been accumulated in the first path of flow, and said conduit means including a path from the first path of flow to the generator whereby refrigerant accumulated in the first path will continue to flow to the generator after the completion of a period of operation.

9. A vacuum type absorption refrigeration system comprising a generator, a liquefier, an evaporator, an absorber, conduit means interconnecting the elements to provide paths of flow for refrigerant and absorbent, means for heating the generator, means for controlling the heating means to operate the system periodically, means in the conduit means between the liquefier and evaporator for accumulating liquid refrigerant during periods of operation of the system until a predetermined amount is accumulated in the path of flow, said last named means being so constructed and arranged as to cause all of said accumulated refrigerant to flow from the path of flow after the completion of a period of operation, and a conduit by-passing the absorber and connected to deliver the accumulated refrigerant to the generator whereby liquid refrigerant is delivered to the generator between periods of operation.

NORTON E. BERRY.

REFERENCES CITED

The following references are of record in the file of this patent:

UNITED STATES PATENTS

| Number | Name | Date |
| --- | --- | --- |
| 1,506,530 | Kasley | Aug. 26, 1934 |
| 1,993,129 | Baird | Mar. 5, 1935 |
| 2,203,207 | Smith | June 4, 1940 |
| 2,223,752 | Allstrand | Dec. 3, 1940 |
| 2,345,454 | Brace | Mar. 28, 1944 |
| 2,345,505 | Siedle | Mar. 28, 1944 |
| 2,399,922 | Grossman | May 7, 1946 |
| 2,408,480 | Reid | Oct. 1, 1946 |
| 2,465,904 | McNeely | Mar. 29, 1949 |
| 2,465,939 | Skomp | Mar. 29, 1949 |
| 2,473,389 | Reid | June 14, 1949 |